(12) United States Patent
Hu (10) Patent No.: US 7,744,289 B2
(45) Date of Patent: Jun. 29, 2010

(54) SEAMLESS DISPLAY MANUFACTURING METHOD

(75) Inventor: Chung-Ming Hu, Taichung (TW)

(73) Assignee: Oripix Holdings Limited, Grand Cayman (KY)

( * ) Notice: Subject to any disclaimer, the term of this patent is extended or adjusted under 35 U.S.C. 154(b) by 155 days.

(21) Appl. No.: 11/871,744

(22) Filed: Oct. 12, 2007

(65) Prior Publication Data

US 2008/0129923 A1      Jun. 5, 2008

(30) Foreign Application Priority Data

Nov. 30, 2006   (TW) .............................. 95144440 A (51) Int. Cl.
*G02F 1/133*  (2006.01)
*G02F 1/1347* (2006.01)

(52) U.S. Cl. .......................................... 385/73; 385/74
(58) Field of Classification Search ................... 349/73, 349/74

See application file for complete search history.

(56) References Cited

U.S. PATENT DOCUMENTS

| 6,057,898 A * | 5/2000 | Itoh et al. ...................... 349/73 |
| 7,268,844 B2 * | 9/2007 | Yu .............................. 349/113 |
| 2001/0046365 A1 * | 11/2001 | Bohle et al. ................. 385/146 |
| 2004/0114249 A1 * | 6/2004 | Nishihara et al. ........... 359/617 |

* cited by examiner

*Primary Examiner*—Charlie Peng
(74) *Attorney, Agent, or Firm*—Rabin & Berdo, P.C.

(57) ABSTRACT

A seamless display manufacturing method includes fixing a light emitting source in a backlight module; fixing an optical film on the light emitting source; placing a partitioned structure on the optical film; aligning or overlapping the side edges of main bodies of adjacent liquid crystal panels, and putting them over the partitioned structure; and providing a protection layer having a micro-structure over a main body of a liquid crystal panel, thus forming an LCD display. A seamless display, comprises: a backlight module, that includes a plurality of light emitting sources; an optical film; a partitioned structure; a plurality of LCD panel main bodies; a protection layer having a micro-structure; and a locking portion. The main bodies of a plurality of liquid crystal panels are put together through aligning or overlapping their respective side edges, and then are covered over the partitioned structure.

18 Claims, 8 Drawing Sheets

SEAMLESS DISPLAY MANUFACTURING METHOD

BACKGROUND OF THE INVENTION

1. Field of the Invention

The present invention relates to a method of manufacturing assembled liquid crystal display, that can be utilized in seamless image displaying large-sized panel.

2. The Prior Arts

Currently, due to the remarkable benefit and performance of liquid crystal panel in commercial advertisement and video entertainment, large-sized panel has become very popular and has a very good prospect and market potential. However, presently, the development and manufacturing of large-sized panel by the various panel manufacturers is still subject to the restrictions in cost and technology that has yet to be overcome. Namely, for the large-sized panel, the production cost is high, yet its production yield is rather low, and this constitutes a great obstacle to the feasibility of its mass production. Due to this reason, the design and manufacturing of large-sized panel by assembling and making use of the panels of currently available sizes is probably one of the most feasible solutions to this problem.

However, in assembling a plurality of liquid crystal panels into a larger-sized one, the gaps in the assembled panel formed by side edges around the perimeter of a constituting unitary panel tend to cause the assembled large-sized panel to produce partitioned, discontinuous image displaying result. An ordinary TV wall is taken as an example, in this case, even though the image produced may present large-sized presentation through a combination of the screens of a plurality of TV sets, thus facilitating outdoors display or viewing, yet the completeness of screen is adversely affected by the evident gaps produced by the outer edge of a screen of each of the respective TV sets. Similarly, in combining a plurality of panels into a single unitary large-sized panel, the outer edges of the respective panels form visible and evident gaps in an assembled panel, hereby resulting in the partition of screen, and the visually imperfect image presentation. Thus, the solution of the problem of how to reduce the gaps in an assembled large-sized panel caused by side edges of the constituting panels is essential to achieve high quality image display.

In the prior art, an improvement of this problem is realized through a light transmission guide, and that is used to transmit the light of the originally smaller surface of light emitting panel of liquid crystal display or plasma display panel to a larger viewing area, thus eliminating the gap between two adjacent light-emitting panels in a larger-sized assembled panel, hereby forming a visually seamless large-sized display. Yet in applying this approach, the light transmission guide is required to contain optical fiber or glass tube capable of reflecting the light, and that leads to the high production cost of the light transmission guide; meanwhile, the overall thickness of the assembled display is too much, thus it is inconvenient to assemble and transport.

In addition, there are the problems of luminance uniformity between the entire assembled panel and a single unitary panel, since the central portion of LC panel is sure to have higher luminance than that of the edge portion, thus, usually, optical correction film (or light filtering sheet) is utilized to filter the light coming from the central portion of panel having higher luminance, so that the luminance of central portion approaching that of the surrounding portion. However, this approach would lead to the overall degradation of the luminance of LC panel, yet the luminance difference between adjacent panels may still exist.

Moreover, in case that the matching between light transmission guide and pixels of panel is not appropriate, or it is not able to achieve optimum matching due to mechanical tolerance, and that may cause color or gray level distortion in displaying images, thus resulting in deviations from the input signals of the original panel.

Summing up the above, presently, the large-sized panel is in great demand for the information and mass communication industries requiring utilization of large-sized panel at reason price. In response to the demand of the industry and the market, the objective of the present invention is to assemble a plurality of smaller LC panels (for example the currently available 26-inch and 32-inch panel) into a larger-sized one at reasonable price, thus achieving almost seamless visual effect of LC panel through a unique optical design on the assembly of the unitary LC panels.

SUMMARY OF THE INVENTION

In view of the restrictions and shortcomings of the liquid crystal display (LCD) image display of the prior art, the objective of the present invention is to disclose a manufacturing method of a seamless display, so that the image signal emitted from LC panel may incident upon and enter into the eyes of a viewer in a direction approximately perpendicular to the protection layer of LC panel, thus avoiding mixing of signals coming from the gaps in an assembled LC panel; meanwhile, the luminance of the image emitted from and near the gaps is enabled to be close to that of the central portion of the various panels assembled, thus creating and maintaining luminance uniformity for various portions in the assembled panel, and achieving the effect and objective of visually seamless image display.

In addition, a further objective of the present invention is to provide a liquid crystal display, including: a backlight unit, an optical film, a partitioned structure, a liquid crystal panel, a protection layer having micro-structures, and a locking portion; thus the LCD display may be assembled through a locking portion thereon and other optical design by making use of more than one unitary panels, hereby forming a visually seamless large-sized display.

To achieve the above-mentioned objective, the present invention provides a method for manufacturing seamless display, including the following steps: fixing an light emitting source in a backlight module; fixing an optical film on the light emitting source; placing a partitioned structure on the optical film; aligning or overlapping the side edges of adjacent liquid crystal panels and putting them over the partitioned structure; and providing a protection layer having a micro-structure on the main body of the side edge aligned or overlapped liquid crystal panel, thus forming an LCD display unit.

Preferably, the protection layer is made of acrylic or glass material, such that on its surface is formed a prism micro-structure by means of film plating, applying glue film, printing, or molding.

Preferably, the light emitting source is a flat light source or quasi-flat light source, wherein, the flat light source is a light emitting diode (LED) or a flat light tube, and the quasi-flat light source is a curve-shaped light tube (for example U-shaped or multi U-shaped light tube).

Furthermore, light is emitted from the flat light source or quasi-flat light source at a specific angle. The specific angle can be varied depending on various conditions, such as size and thickness of the panel, or size of the light box in a backlight module, so as to obtain sufficient supply of light.

Preferably, the flat light source or quasi-flat light source is packaged and/or is provided with light cover.

Preferably, the flat light source or quasi-flat light source is interleavingly arranged into matrix elements of equal spacing.

Preferably, the flat light source or quasi-flat light source further includes a prism film, a diffuser film or a diffuser plate.

Preferably, a trapezoidal plate is disposed on a side of the flat light source or quasi-flat light source to form a grid-shaped partitioned structure.

Preferably, upon being emitted from the flat light source or quasi-flat light source, the light emitted can be made to distribute evenly.

Preferably, the light output from the matrix can be controlled through the magnitude of a current.

Preferably, the central portion of each of the respective light emitting diodes in the matrix is arranged to face the perimeter of the panel.

Preferably, the positions of the respective rows of light-emitting-diodes in the matrix can be varied.

Preferably, at least a ring of light-emitting-diodes can be additionally added to the perimeter of the trapezoidal plate on a side of the quasi-flat light source.

Preferably, at least a Cold Cathode Fluorescent Lamp (CCFL) or a Hot Cathode Fluorescent Lamp (HCFL) can be additionally added to each of the respective sides of a trapezoidal plate on a side of the quasi-flat light source.

Moreover, a still further objective of the present invention is to provide a seamless display, including: a backlight module, which includes a plurality of light emitting sources; an optical film; a partitioned structure; a plurality of LCD panels; a protection layer having micro-structures; and a locking portion, hereby forming a display unit; wherein, the side edges of a plurality of liquid crystal panels can be aligned or overlapped, then be used to cover over the partitioned structure.

Preferably, the protection layer is made of acrylic or glass material, such that on its surface is formed a prism micro-structure by means of film plating, applying glue film, printing, or molding.

Preferably, the light emitting source is a flat light source or quasi-flat light source, wherein, the flat light source is a light emitting diode (LED) or a flat light tube, and the quasi-flat light source is a curve-shaped light tube (for example U-shaped or multi U-shaped light tube).

Preferably, the display includes the flat light source or quasi-flat light source is packaged and/or provided with a light cover.

Preferably, the display includes the flat light source or quasi-flat light source interleavingly arranged into matrix elements of equal spacing.

Preferably, the display includes a prism file, a diffuser film or a diffuser plate.

Preferably, the display includes a trapezoidal plate disposed on a side of the flat light source or quasi-flat light source to form a grid-shaped partitioned structure.

Preferably, at least a ring of light-emitting-diodes can be additionally added to the perimeter of a trapezoidal plate on a side of the quasi-flat light source.

Preferably, at least a Cold Cathode Fluorescent Lamp (CCFL) or a Hot Cathode Fluorescent Lamp (HCFL) can be additionally added to each of the respective sides of a trapezoidal plate on a side of the quasi-flat light source.

Summing up the above, the present invention discloses a method of manufacturing an assembled panel used for a display, wherein, at least a locking portion is used to bond and connect more than one liquid crystal panels, hereby achieving high and uniform luminance for the entire assembled panel through adjusting the incident angle of light coming from light source, and raising the luminance of gaps between the constituting panels assembled. As such forming a visually seamless large-sized display, that is capable of raising its image display quality remarkably, in addition to reducing its production cost significantly.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, and functions of the present invention can be appreciated and understood more thoroughly through the following detailed description with reference to the attached drawings.

Although, in the following, the preferred embodiments of the present invention will be described with reference to the attached drawings. However, it should be appreciated that the contents of the present invention can be modified within its scope and spirit by people skilled in the art, while achieving the effectiveness of the present invention. Therefore, the following description is a broad disclosure in general, and it is not intended to restrict the scope of the present invention.

Figure 1:
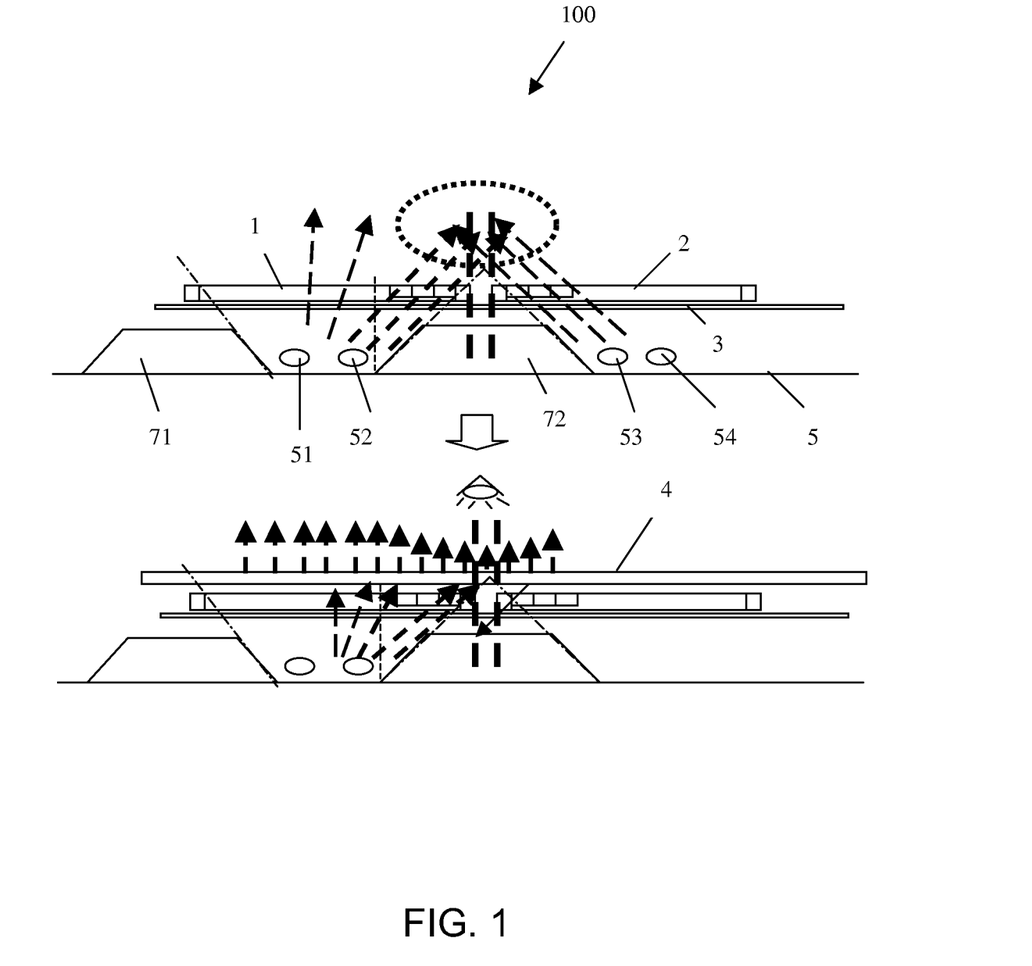
FIG. 1 is a schematic diagram of a structure of seamless display and the proceeding of an image displaying light according to the present invention.

Firstly, please refer to FIG. 1, which is a schematic diagram of a structure of seamless display and the proceeding of an image displaying light according to the present invention. As shown in FIG. 1, display 100 includes a liquid crystal panel 1 and a liquid crystal panel 2, and any one side of liquid crystal panel 1 is aligned or overlapped with any one side of liquid crystal panel 2; an optical film 3, a protection layer 4, and a backlight module 5 (containing light emitting sources 51-54, with its perimeter may further be added trapezoidal plates 71 and 72), and the protection layer 4 is at the outer most layer of the display.

Figure 2:
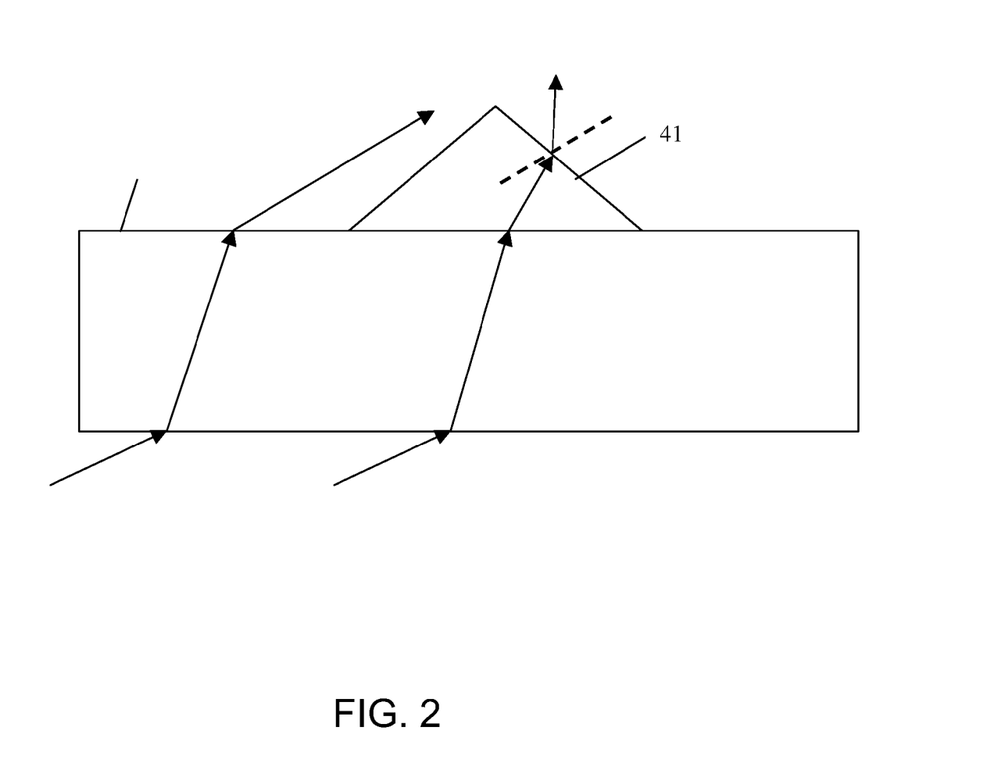
FIG. 2 is a front view of a micro-structure on a protection layer according to the present invention.

Next, please refer to FIG. 2 in conjunction with FIG. 1. FIG. 2 is a front view of a micro-structure on a protection layer according to the present invention. Since for an assembled liquid crystal panel in a display, any one side of a unitary panel is made to align or overlap with any one side of another unitary panel, thus the interleaving of obliquely incident lights passing through the gap between adjacent panel tend to create mixing of the image signals, hereby reducing the clearness of the image displayed. In the present preferred embodiment, in order that the image signals emitted from a panel may incident upon and enter into the eye of a viewer at an angle of 90 degrees and approximately perpendicular to the protection layer of the panel, thus avoiding mixing of video signals, a necessary correction is performed by a prism micro-structure 41 formed on a surface of a protection layer 4 (made of acrylic or glass material) in the outer most layer of an assembled panel, so that the light emitted from a panel may incident upon and enter into the eyes of a viewer at an angle approximately perpendicular to the protection layer of the panel, hereby avoid mixing of video signals at/near the gaps. As such, the protection layer has the functions of both protection and straightening the emitted lights (refer to FIG. 1). As to the formation of prism micro-structure 41, in addition to the printing and film plating as shown in FIG. 2, the molding method may also be utilized.

In another preferred embodiment, upon achieving the improvement of making the light emitted from the assembled panel incident upon and enter into viewer's eyes approximately perpendicularly and avoid signal mixing nearby the gaps, various optical designs may further be used, so that the light from light source of a display may emit at a certain angle, thus the luminance of the emitted images near the gaps of an assembled panel may close to the luminance at the central portion of the assembled panel, hereby achieving the objective of uniform luminance at various portions of the panel to form a visually seamless display. Therefore, the purpose of the above-mentioned light emitting at a specific angle is only to make sure that lights emitted from light source in a backlight module will not diverge without any restrictions; it will incident upon near the gaps of the assembled panel, so that the luminance of the emitted lights near the gaps will be raised, thus the emission of lights is not restricted strictly to a certain range of angles.

Figure 3:
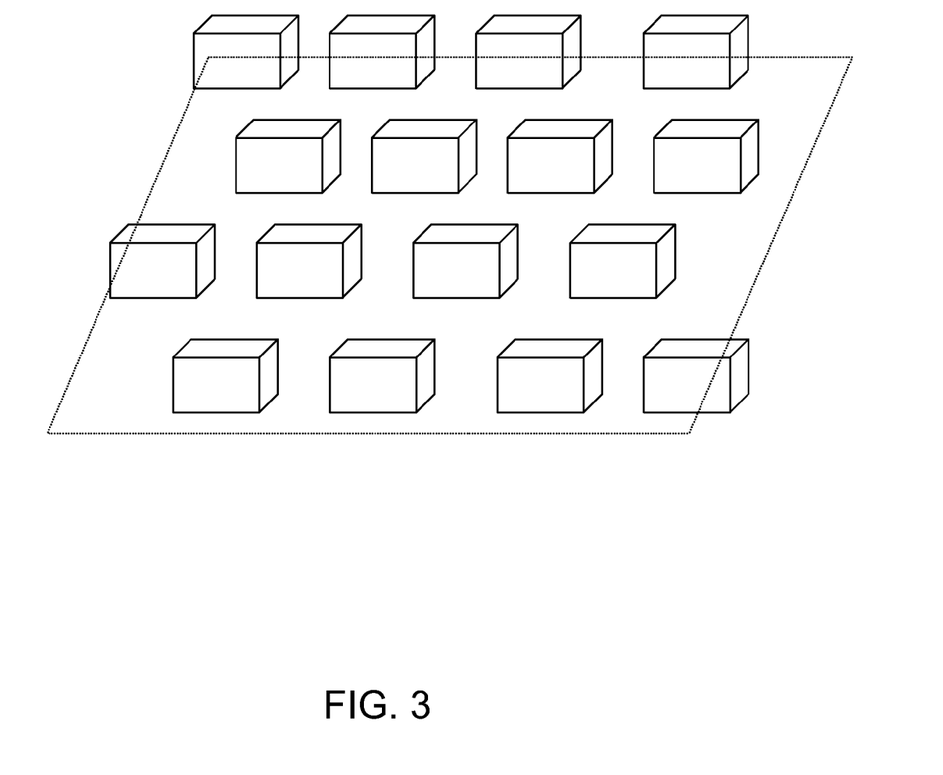
FIG. 3 is a schematic diagram indicating interleavingly arranging light-emitting-diodes into a matrix of equal spacing members according to the present invention.

By way of example, special design may be made to package the light-emitting-diodes or add special light cover, so as to raise the light luminance at the gaps. Or, alternatively, the light-emitting-diodes may be arranged in an interleaving manner as shown in FIG. 3 to form a matrix of equal spacing members, as such creating a flat light source having special light distribution characteristics, such as light-emitting-diodes of up-and-down interleaving arrangement.

Similarly, in order to enhance light emitting efficiency and an even distribution of light, a prism film, a diffuser film or a diffuser plate may be added in a backlight module.

Figure 4:
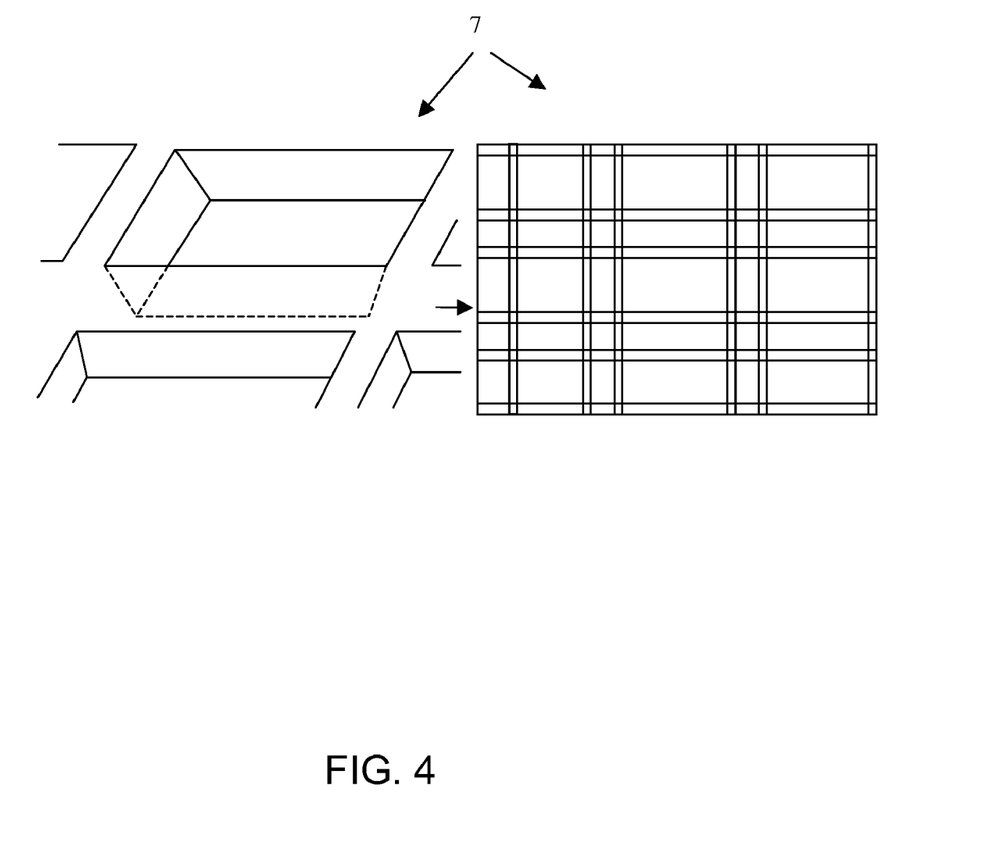
FIG. 4 is a schematic diagram indicating a partitioned structure formed by a plurality of trapezoidal plates according to the present invention.

Alternatively, in order that light distribution may be concentrated in a more appropriate manner, a partition structure 7 may be added into a matrix of equally spaced LED's. Such partition structure is formed by a plurality of trapezoidal plates (such as 71 and 72 as shown in FIG. 1), and that is used to restrict the divergence of light of a light source, so that it may incident upon a panel at a specific angle to form light distribution of higher degree of uniformity. On the whole, the partition structure formed by placing trapezoidal plates into matrix of equally spaced LED's presents a grid-shaped structure (refer to FIG. 4).

Moreover, in addition to light-emitting-diodes utilized as light source as mentioned above, flat florescent lamps (FFL) or curve-shaped lamps (such as U-shaped, multi U-shaped or other curve-shaped lamps) may also be arranged into a matrix, thus making light to incident upon the panel at specific angle by adding trapezoidal plates to restrict the proceeding direction of light.

In a yet another preferred embodiment, several approaches can be taken to make the lights coming from a light source in a backlight module to distribute more evenly, so as to achieve higher degree of uniformity. For example, the magnitude of a current input to the light source can be regulated, so that the luminance of the edges on both sides of panel can be close to that at the central portion. In general, the luminance of the edges on both sides of panel is lower than that at the central portion, thus the magnitude of input current can be regulated to control the matrix, so that light emitted from light source in the perimeter of a matrix is brighter than that from the central portion, as such the intensity of light emitted from the surface of the protection layer may be kept uniform for various parts of the panel after fine tuning.

In this case, the light-emitting-diode is taken as an example. In order to realize much more even distribution of light intensity, the input current to LED's for each row and/or column of a matrix formed by LED's can be regulated, so that light output from LED's at central portion is smaller than that as output from LED's at two sides, thus the intensity of light produced by LED's at outer perimeter is stronger than that as produced by LED's at central portion, hereby achieving even more uniform distribution of light intensity and realizing seamless panel of high uniformity of light intensity.

Figure 5:
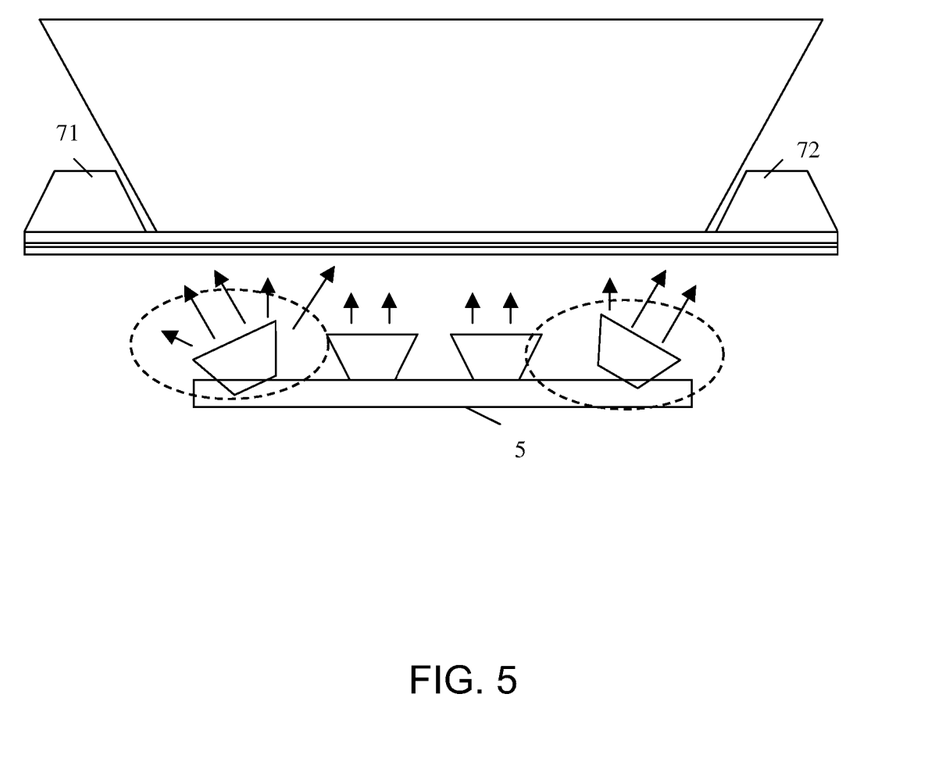
FIG. 5 is a schematic diagram indicating the adjustment of facing angle of the respective row of an LED matrix according to the present invention.

In addition, please refer to FIG. 5, which is a schematic diagram indicating the adjustment of facing angles of the respective rows and/or columns of an LED matrix according to the present invention. Wherein, a unitary LED on the perimeter of a matrix having higher light intensity than that of a central portion LED is made to face the perimeter of a panel, so that light intensity at that portion is close to that of a central portion of the panel, thus achieving even distribution of light intensity.

Figure 6:
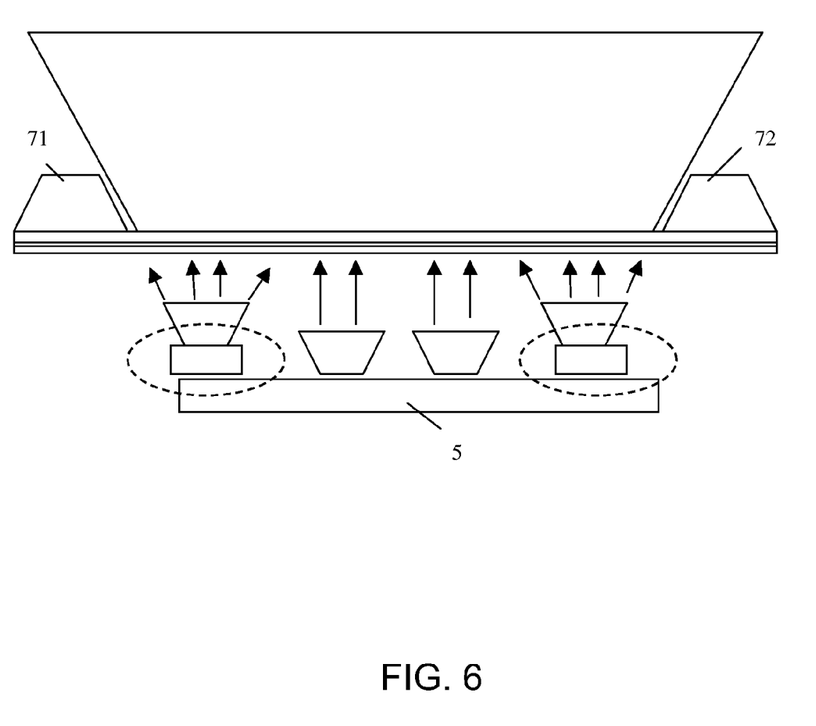
FIG. 6 is a schematic diagram indicating that the distance between LED's in a matrix and LC panel can be adjusted to achieve even distribution light intensity according to the present invention.

Furthermore, please refer to FIG. 6, which is a schematic diagram indicating that the distance between LED's in a matrix and LC panel can be adjusted to achieve even distribution light intensity according to the present invention. For example, the relative positions of the respective rows of LED's in a matrix can be varied, so that the light intensity of LED's at the edge of a matrix is higher than that at the central portion, hereby realizing even distribution of light intensity.

Figure 7:
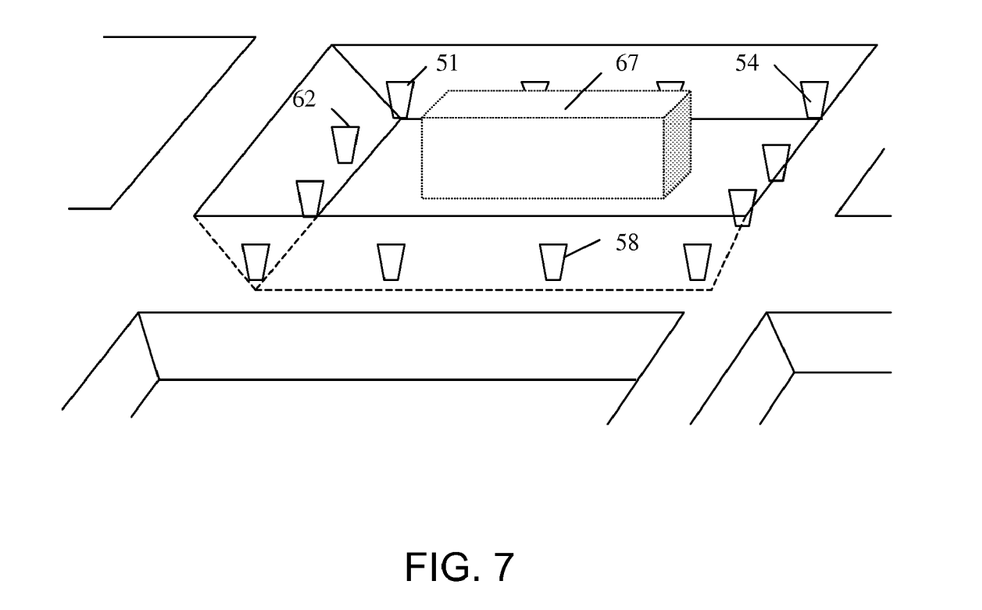
FIG. 7 is a schematic diagram indicating adding light-emitting-diodes to the perimeter of quasi-flat light source according to the present invention.

Similarly, in a design of achieving high uniformity of light intensity for a light source matrix, flat light tube or curve-shaped light tube (for example U-shaped or multi U-shaped light tube) may be utilized as the major light source. Referring to FIG. 7, in order to avoid the problem that for the quasi-flat light source, light intensity in the perimeter is weaker and light is darker near the gaps for being farther away from light source, light-emitting-diodes can be added to the perimeter of the quasi-flat light source 67 to enhance the intensity of incident light near the border of adjacent panels, hereby increasing the overall uniformity of luminance of light of an assembled panel. Namely, a ring or several rings of light-emitting-diodes can be added to the edges of a matrix of multi U-shaped light tubes (such as light-emitting-diodes 51-62 as shown in FIG. 7), so that the luminance of light in the perimeter of panel is higher than that in the central portion (in FIG. 7 is shown the overall outlook of a quasi-flat light source, but not the arrangement of multi U-shaped light tubes).

Figure 8:
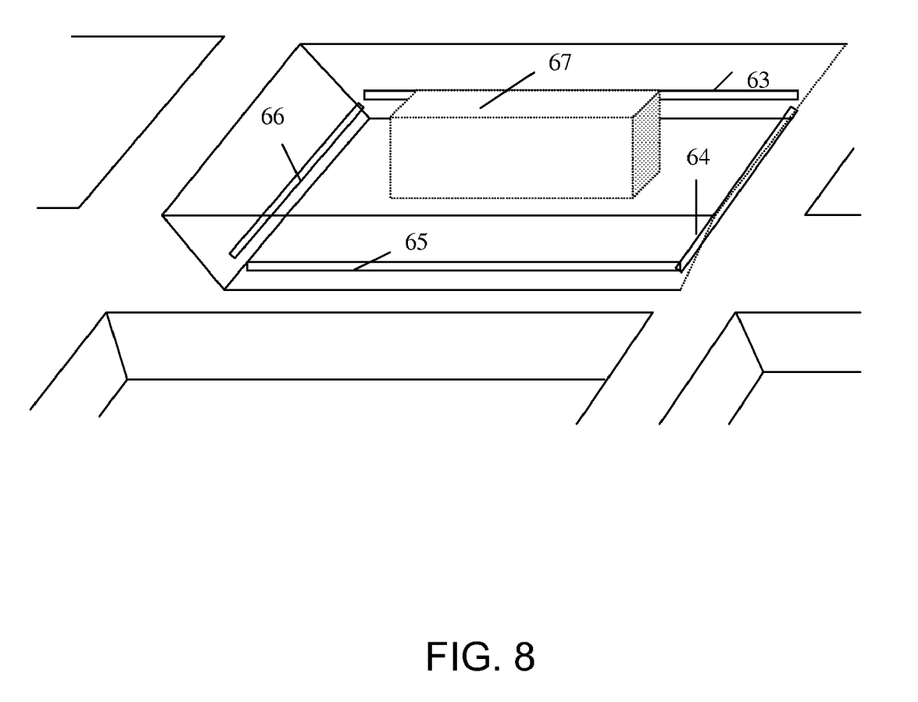
FIG. 8 is a schematic diagram indicating adding cold cathode fluorescent lamp (CCFL) and hot cathode fluorescent lamp (HCFL) to the perimeter of quasi-flat light source according to the present invention.

Alternatively, Cold Cathode Fluorescent Lamps (CCFL) or Hot Cathode Fluorescent Lamps (HCFL) may be added in the perimeter of the trapezoidal plates in a matrix of flat light source or quasi-flat light source (such as the CCFL's 63-66 as shown in FIG. 8), thus increasing the intensity of incident light near the border of adjacent panels, and raising the overall uniformity of luminance of an assembled panel.

Summing up the above, application of present invention is realized through the optical designs that the signal mixing near the gaps of an assembled panel is first avoided, and lights emitted from light source are made to emit at a specific angle, then lights emitted from light source are raised to a high uniformity of luminance, hereby realizing a visually seamless display.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A method of manufacturing seamless display, including:
   fixing a light emitting source in a backlight module;
   fixing an optical film on said light emitting source;
   placing a partitioned structure on said optical film;
   aligning or overlapping side edges of main bodies of adjacent liquid crystal panels, and putting the main bodies of the adjacent liquid crystal panels over said partitioned structure; and
   providing a protection layer having micro-structures over said main bodies of said liquid crystal panels having the side edges aligned or overlapped, thus forming a display unit.

2. The method as claimed in claim 1, wherein said protection layer is made of acrylic or glass material, and on its surface is disposed a prism micro-structure made by means of film plating, glue film applying or molding.

3. The method as claimed in claim 1, wherein said light emitting source is a flat light source or a quasi-flat light source.

4. The method as claimed, in claim 3, wherein said flat light source is a light-emitting-diode or a flat light tube; and said quasi-flat light source is a curve-shaped light tube.

5. The method as claimed in claim 3, further comprising enabling said flat light source or said quasi-flat light source to emit light at specific angle.

6. The method as claimed in claim 5, wherein said flat light source or said quasi-flat light source is packaged and added light cover, arranged interleavingly into a matrix of equal spacing elements, further including a prism film, a diffuser film or a diffuser plate, disposing a trapezoidal plate on a side of said flat light source or said quasi-flat light source, thus forming a grid-shaped partition structure.

7. The method as claimed in claim 5, further comprising evenly distributing said flat light source.

8. The method as claimed in claim 7, further comprising controlling the optical output of a matrix through a current, making unitary light-emitting-diodes in the perimeter of said matrix to face toward the perimeter of said panel, or changing relative positions of said unitary LED's in respective rows of said matrix.

9. The method as claimed in claim 5, further comprising evenly distributing said quasi-flat light source.

10. The method as claimed in claim 9, wherein at least a ring of light-emitting-diodes are placed in the perimeter of a trapezoidal plate on a side of said quasi-flat light source, or at least a CCFL or a HCFL is placed on each of the respective sides of a trapezoidal plate on a side of said quasi-flat light source.

11. The method as claimed in claim 9, further comprising controlling the optical output of a matrix through a current, making unitary light-emitting-diodes in the perimeter of said matrix to face toward the perimeter of said panel, or changing relative positions of said unitary LED's in respective rows of said matrix.

12. A seamless display, comprising:
   a backlight module, that includes a plurality of light emitting sources;
   an optical film;
   a partitioned structure;
   a plurality of LCD panel main bodies;
   a protection layer having micro-structure;
   a locking portion; and
   a packaged and added light cover of said light emitting sources, said light emitting sources being arranged interleavingly into a matrix of equal spacing elements, further included a prism film, a diffuser film or a diffuser plate, a trapezoidal plate disposed on a side of said light emitting sources, thus forming a grid-shaped partition structure, wherein, main bodies of a plurality of liquid crystal panels are put together through aligning or overlapping respective side edges of the main bodies, and then are covered over said partitioned structure.

13. The seamless display as claimed in claim 12, wherein said protection layer is made of acrylic or glass material, and on its surface is disposed a prism micro-structure made by means of film plating, glue film applying or molding.

14. The seamless display as claimed in claim 12, wherein said plurality of light emitting sources is flat light source.

15. The seamless display as claimed in claim 14, wherein said flat light source is a light-emitting-diode or a flat light tube.

16. The seamless display as claimed in claim 12, wherein said plurality of light emitting sources is a quasi-flat light source.

17. The seamless display as claimed in claim 16, wherein at least a ring of light-emitting-diodes are placed in the perimeter of said trapezoidal plate on a side of said quasi-flat light source, or at least a CCFL or a HCFL is placed on each of the respective sides of said trapezoidal plate on a side of said quasi-flat light source.

18. The seamless display as claimed in claim 16, wherein said quasi-flat light source is a curved-shaped light tube.

* * * * *